June 2, 1931.    G. E. SMITH    1,808,324
STEERING WHEEL AND METHOD OF MAKING THE SAME
Filed Dec. 2, 1926
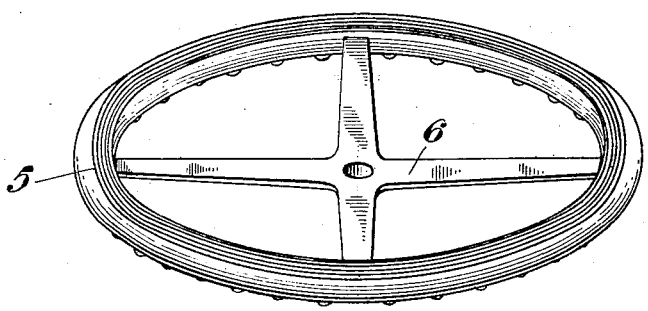
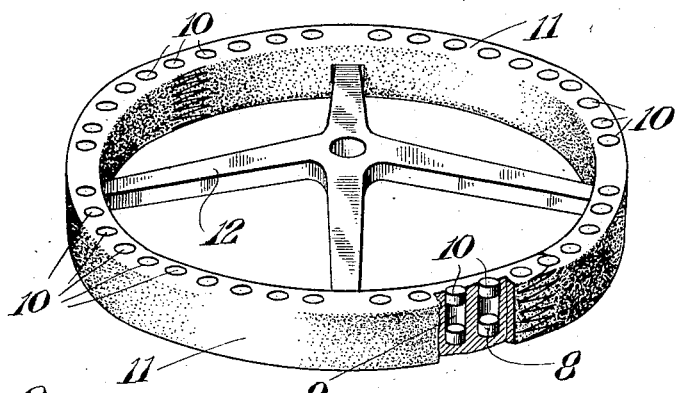
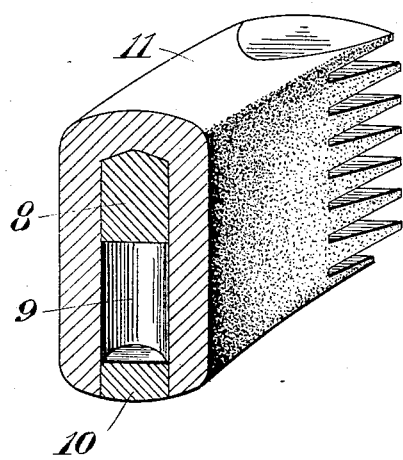
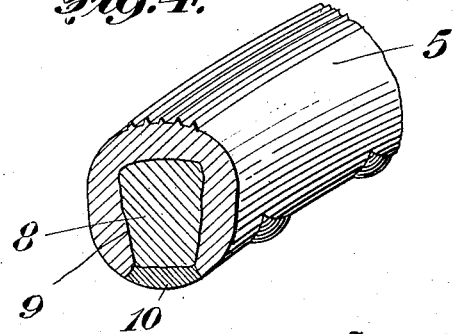
Inventor.
Grant E. Smith,
By his Attorneys Patented June 2, 1931

1,808,324

UNITED STATES PATENT OFFICE

GRANT E. SMITH, OF POUGHKEEPSIE, NEW YORK, ASSIGNOR TO POUVAILSMITH CORPORATION, OF POUGHKEEPSIE, NEW YORK, A CORPORATION OF NEW YORK

STEERING WHEEL AND METHOD OF MAKING THE SAME

Application filed December 2, 1926. Serial No. 152,108.

The present invention relates to steering wheels for automobiles.

The steering gears of automobiles are so constructed that rough spots in the road cause vibrations which are transmitted to the steering wheels as rotary vibrations. This is especially true of certain types of steering gears used on the larger and heavier cars. When driving over rough roads this vibration is very tiring and the driver may even find his arms becoming numb from the repeated jar.

It has been found that the vibration can be reduced by increasing the weight of the wheel, especially toward or at the rim thereof. But the present demand is for a steering wheel having wooden spokes and a wooden rim of a shape and size to be comfortably held in the hand.

It is an aim of the present invention to provide an improved steering wheel that will have the desired features of the all wood wheel and yet will be of sufficient weight to reduce the vibration in use.

The nature and objects of the invention will be better understood from a consideration of a particular illustrative embodiment thereof, for the purpose of which description reference may be had to the accompanying drawings forming a part hereof and in which Figure 1 is a perspective view of a steering wheel embodying the invention.

Figure 2 is a perspective view of an assembled blank from which the wheel is to be formed, the blank being shown in inverted position ready to be molded.

Figure 3 is a perspective view, partly in section, of a portion of the rim of the blank shown in upright position, and Figure 4 is a similar view of a portion of the rim of the finished wheel.

The wheel shown for the purpose of illustrating the invention is an all wood wheel, the weight of which is increased by inserts of lead which are entirely enclosed leaving only wood to contact with the hands of the driver. In the particular structure shown the lead inserts are positioned in the rim only, but this arrangement is merely illustrative.

This wheel comprises a wooden rim 5 with wooden spokes 6, the rim being loaded with lead to increase the weight thereof. The inserted lead may conveniently be in the form of plugs 8 inserted in holes 9 closed by wooden plugs 10. The plugs may be of convenient or desired form as, for example, of the length of the space in which they are inserted and of smaller diameter to permit longitudinal compresion with the compression of the wood, or they may be shorter and of the diameter of the holes as in the arrangement illustrated.

The preferred method of constructing the wheel to be herein described involves compressing and molding a suitably formed blank to form the finished wheel. The blank comprising the rim sections 11 and spokes 12 assembled as shown in Figure 2, the joints being coated with a suitable adhesive, is compressed in a suitable mold heated to such a temperature as will permit compressing and molding the wood to conform to the mold. The blank is preferably held in inverted position during molding, if the lead weights or plugs 8 are of the form shown, in order that said plugs may lie in the ends of the recesses provided therefor. Preferably the compressing and molding operation is performed while the blank is maintained in heated condition and the compressed blank is cooled while it is held in the mold under compression. The pressure may range, for example, from 500 to 5000 lbs. per square inch of the blank to be compressed depending upon the amount of compression desired and the material. The temperature at which the operation is performed may vary considerably. Successful results have been obtained at temperatures approximating 300° Farenheit.

The foregoing description of a particular embodiment is illustrative merely and is not intended as defining the limits of the invention.

I claim—

1. A steering wheel comprising a wooden rim having recesses and weight increasing material inclosed within said recesses together with a wooden plug sealing said recesses and enclosing the weight increasing material.

2. A steering wheel comprising a rim of relatively light material having a recess and relatively heavy material together with a plug of relatively light material sealing said recess and retaining said relatively heavy material therein.

3. The method of making a steering wheel which comprises preparing a rim blank with a weight increasing material inclosed therein and molding said rim blank to compact the blank about the weight increasing material and to form the rim.

4. A steering wheel comprising a rim having a recess formed on a side thereof, and weight increasing material inserted within said recess, said material substantially increasing the weight of the rim for the purposes set forth, and a wooden filler inserted in said recess over said weight increasing material.

5. A steering wheel comprising a wooden rim with a heavy material enclosed within said rim at intervals to substantially increase the weight thereof for the purposes set forth, said weight increasing material comprising lead.

6. The method of making a steering wheel which comprises preparing a rim blank, recessing the prepared rim from a side thereof, inserting weight increasing material within said recess and comprising and molding said rim blank.

7. The method of making a steering wheel which comprises preparing a rim blank, recessing the prepared rim from a side thereof, inserting a weight increasing material within said recess, enclosing said weight increasing material with a filler of material similar to that composing the body of the rim and compressing and molding the whole.

8. The method of making a steering wheel as specified in claim 7 further characterized by placing said rim in inverted position to cause said weight increasing material to remain in the bottom of said recess during the compressing and molding step.

9. The method of making a steering wheel which comprises combining with the rim spaced inserts of another material which is relatively heavier than the material of the rim for substantially increasing the weight of the rim to reduce vibration transmitted to the hands of the driver and molding the assembly under pressure to form the finished rim with the moldable material compacted and molded about the weight increasing material.

In testimony whereof, I have signed my name to this specification this 29th day of October, 1926.

GRANT E. SMITH.